H. W. YOUNG.
STYLUS FOR GRAPHIC RECORDING INSTRUMENTS.
APPLICATION FILED DEC. 5, 1910.
1,008,100.
Patented Nov. 7, 1911.
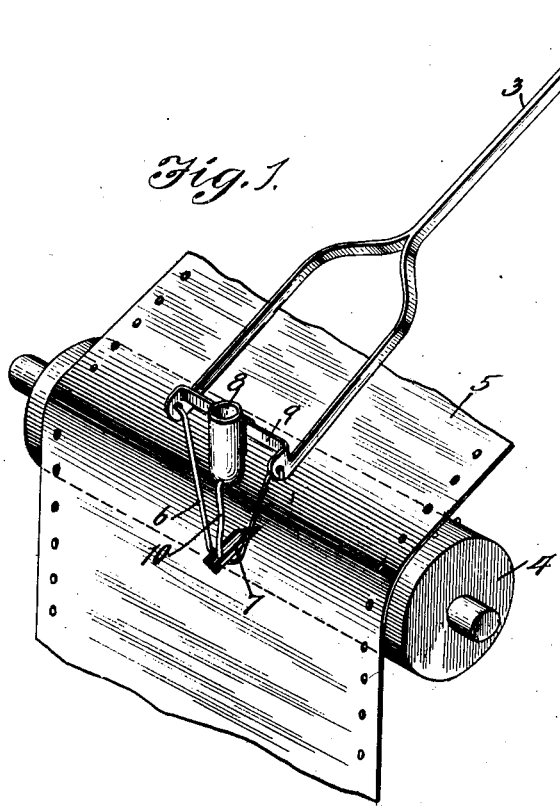
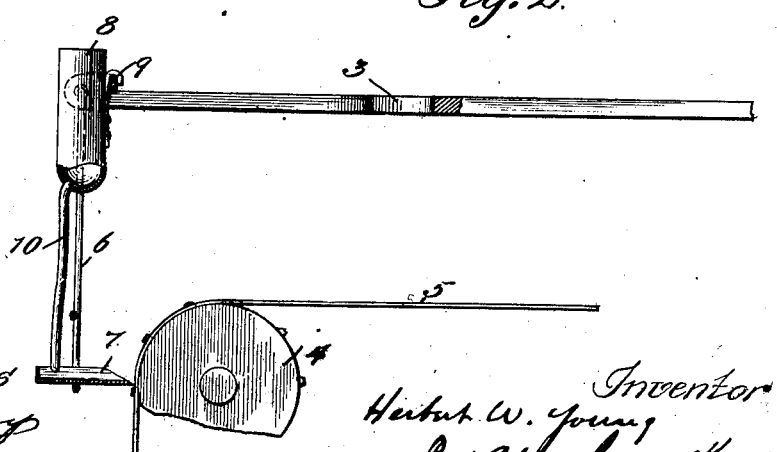

UNITED STATES PATENT OFFICE.

HERBERT W. YOUNG, OF CHICAGO, ILLINOIS, ASSIGNOR TO SANGAMO ELECTRIC COMPANY, OF SPRINGFIELD, ILLINOIS, A CORPORATION OF ILLINOIS.

STYLUS FOR GRAPHIC RECORDING INSTRUMENTS.

1,008,100.        Specification of Letters Patent.      Patented Nov. 7, 1911.

Application filed December 5, 1910. Serial No. 595,647.

*To all whom it may concern:*

Be it known that I, HERBERT W. YOUNG, a citizen of the United States, residing at Chicago, in the county of Cook and State of Illinois, have invented certain new and useful Improvements in Styli for Graphic Recording Instruments, of which the following is a specification, reference being had to the accompanying drawings.

My invention is for an improvement in the styli for graphic recording instruments, and its object is to produce a new and improved form of stylus or recording pen which will operate with very little friction on the paper over which the stylus moves in producing its record. As is well known in instruments of this class the record of the variations of the force which is sought to be recorded is made by means of a pen carried by a moving arm operated by the force whose variations it is desired to record, and this pen bearing against the surface of a moving strip of paper of course records the variations in force. One difficulty in these instruments has been that the friction of the pen as it is moving back and forth over the moving paper is such as to seriously influence the moving of the motor element—whatever that may be—when operating under very low load or power. If the stylus itself is so constructed as to contain ink enough so as to continue the record over a considerable space of time, the stylus is somewhat heavy; and, as the end of the arm on which the stylus is carried moves in an arc of a circle, and as the pen must be so hung as to be constantly in contact with the surface of the paper, the weight of the pen, when so constructed as to carry a sufficient amount of ink to last for any considerable time, is such as to cause considerable friction and cause inaccuracy of the instrument at low loads.

It is the object of my invention to produce a new and improved stylus or pen for such instruments that will overcome these objections and work with very little friction over the paper.

In the accompanying drawings,—Figure 1 is a perspective view; and Fig. 2 is a side elevation.

Referring to the drawings,—3 indicates a movable arm, which is connected with and operated by any suitable form of motor element operated by the force whose variations it is desired to measure and record,—such, for instance, as an electric meter, or any other well-known form of measuring device. As the moving motor element may be of any well-known character and adapted to measure the variations of any force so far as my present invention is concerned, and as my present invention is not in any way connected with the form of the motor element, I have not shown any such motor element in the drawing, but only the moving arm operated thereby, as it is believed this will be sufficient to illustrate my invention. 4 indicates a roller, which constitutes a well-known part of such instruments and may be of any well-known form and character and driven in any suitable manner in such a way as to move longitudinally of itself a strip of paper 5.

6 indicates a hanger, which is pivotally suspended from the end of the moving arm 3 and extends downward opposite the face of the roller 4.

7 is the stylus or marking pen proper, which consists of a pen-pointed trough adapted to convey ink, when supplied to it as hereinafter described, to the point and from thence trace the line upon the paper. The trough and hanger are constructed of any suitable very light material, and are so swung that the point of the pen rests lightly against the surface of the paper.

8 indicates a reservoir adapted to contain a supply of ink and rigidly supported on the end of the moving arm 3, as on crossbar 9.

10 indicates a capillary tube or wick, which opens at its upper end into the bottom of the reservoir 8 and at its lower end extends downward close to the trough 7. The reservoir and capillary tube are, of course, rigid with the arm, which is itself, of course, sufficiently rigidly connected to the motor element, of whatever kind may be used. As the paper moves under the influence of the roll and the arm 3 is swung from side to side under the varying impulses of the force whose variations are sought to be recorded, the point of the pen, of course, will be carried across the paper with it from side to side, producing the characteristic lines on the paper, and the pen, swung vertically as above set forth, will always be in contact with the surface of the paper, being held against it by gravity. The paper is, of course, supplied from any suitable roll (not shown). The ink will be drawn by capillary attraction from the reservoir through the capillary tube and constantly supplied to the pen, and the reservoir may be made of sufficient size to carry a supply of ink large enough to last a considerable time.

It will be obvious from the above description that the pen itself is wholly freed from the weight of the ink and ink reservoir, and therefore the weight of these parts in no way bears upon the pen so as to cause increased friction, and as the pen and hanger may be made very small and of very light material the friction of the pen upon the paper is reduced to a minimum.

That which I claim as my invention, and desire to secure by Letters Patent, is,—

1. In combination, a moving member, a stylus swingingly suspended from said moving member, an ink reservoir carried by said moving member, and means for leading ink from said reservoir to said stylus.

2. In combination, an oscillatory arm, a support pivotally suspended from said arm, a stylus carried by said support, an ink reservoir secured to said arm, and a capillary tube adapted to lead ink from said reservoir to said stylus.

3. In combination, an oscillatory arm, a hanger pivotally suspended from said arm, a trough-shaped stylus carried by said hanger, an ink reservoir secured to said arm, and a capillary tube adapted to feed ink from said reservoir to said stylus.

4. In a graphic recording instrument, in combination an oscillatory arm, a stylus swingingly suspended from said oscillatory arm, an ink reservoir carried by said oscillatory arm, and means carried by said reservoir for feeding ink therefrom to said stylus.

5. In a graphic recording instrument, in combination a roller adapted to feed paper, a substantially horizontal moving arm adapted to swing back and forth over said roller, a hanger suspended from the end of said oscillatory arm, a stylus carried by said hanger, an ink reservoir secured to said oscillatory arm, and a tube carried by said ink reservoir and adapted to gradually feed ink to said stylus.

HERBERT W. YOUNG.

Witnesses:
  C. E. Pickard,
  M. A. Hunter.